United States Patent
Ravindranath et al.

(10) Patent No.: US 9,645,872 B1
(45) Date of Patent: May 9, 2017

(54) METHOD TO USE MULTIPATH TO REDUCE IO ERROR HANDLE DURATION

(71) Applicant: EMC Corporation, Hopkinton, MA (US)

(72) Inventors: Anil Ravindranath, Sunnyvale, CA (US); Krishna Gudipati, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 95 days.

(21) Appl. No.: 14/671,670

(22) Filed: Mar. 27, 2015

(51) Int. Cl.
G06F 11/00 (2006.01)
G06F 11/07 (2006.01)

(52) U.S. Cl.
CPC ...... *G06F 11/0784* (2013.01); *G06F 11/0769* (2013.01)

(58) Field of Classification Search
USPC .......................................................... 714/4.2
See application file for complete search history.

(56) References Cited

U.S. PATENT DOCUMENTS

| | | | | |
|---|---|---|---|---|
| 4,187,387 A | * | 2/1980 | Parmer .................... | H01B 5/02 174/125.1 |
| 5,948,108 A | * | 9/1999 | Lu ........................ | G06F 11/201 370/216 |
| 6,073,248 A | * | 6/2000 | Doshi ................. | H04J 14/0227 398/1 |
| 6,954,881 B1 | * | 10/2005 | Flynn, Jr. .............. | G06F 3/0617 714/43 |
| 7,007,189 B2 | * | 2/2006 | Lee ......................... | H04L 45/22 710/38 |
| 7,451,341 B2 | * | 11/2008 | Okaki .................... | G06F 11/201 714/4.1 |
| 8,069,364 B2 | * | 11/2011 | Coronado ........... | G06F 11/0727 714/3 |
| 8,381,027 B1 | * | 2/2013 | Liu ....................... | G06F 11/201 714/13 |
| 8,621,121 B1 | * | 12/2013 | Bappe ................. | G06F 11/1443 710/11 |
| 2001/0048660 A1 | * | 12/2001 | Saleh .................. | H04J 14/0295 370/216 |
| 2003/0023893 A1 | * | 1/2003 | Lee ........................ | H04L 45/00 714/4.5 |

(Continued)

*Primary Examiner* — Amine Riad
(74) *Attorney, Agent, or Firm* — Blakely Sokoloff Taylor & Zafman LLP

(57) ABSTRACT

A system for handling errors during interfacing with storage devices comprises a communications interface and an error handler. The error handler is for: indicating to provide a first instruction to the first storage device using the first path; determining whether an error or time out message is received; in the event the error handler determines that either message is received: indicating to provide a second instruction to the first storage device using a second path; determining whether a second error or second time out message is received; in the event the error handler determines that either message is received, indicating to provide a likely first storage device error message; and in the event the error handler determines that either message is not received, indicating to provide a likely first path error message and indicating to communicate using the second path.

20 Claims, 5 Drawing Sheets

(56) References Cited

U.S. PATENT DOCUMENTS

| | | | | |
|---|---|---|---|---|
| 2004/0107320 A1* | 6/2004 | Gallo | ............... | G06F 11/1443 711/147 |
| 2004/0172489 A1* | 9/2004 | Shikada | ............. | G06F 11/2094 710/15 |
| 2005/0188239 A1* | 8/2005 | Golasky | ............... | G06F 11/201 714/2 |
| 2005/0188247 A1* | 8/2005 | Abe | ................... | G06F 3/0614 714/5.1 |
| 2006/0117215 A1* | 6/2006 | Yanagisawa | ......... | G06F 11/201 714/5.1 |
| 2006/0184823 A1* | 8/2006 | Matsuki | ............. | G06F 11/0727 714/12 |
| 2006/0233204 A1* | 10/2006 | Pomaranski | ....... | G06F 11/2005 370/535 |
| 2009/0187708 A1* | 7/2009 | Kurokawa | ........... | G06F 3/0617 711/114 |
| 2010/0023801 A1* | 1/2010 | Coronado | .......... | G06F 11/0727 714/5.11 |
| 2012/0124414 A1* | 5/2012 | Dallas | ................ | G06F 11/2005 714/6.2 |
| 2012/0159265 A1* | 6/2012 | Nishita | .................. | G06F 11/10 714/49 |
| 2013/0007504 A1* | 1/2013 | Bodke | ............... | G06F 11/1423 714/4.2 |
| 2013/0315058 A1* | 11/2013 | Otaka | .................. | G06F 11/201 370/228 |
| 2014/0122816 A1* | 5/2014 | Barnes | ................... | G06F 11/20 711/162 |
| 2014/0365832 A1* | 12/2014 | Neeb | .................. | G06F 13/1673 714/43 |

\* cited by examiner

METHOD TO USE MULTIPATH TO REDUCE IO ERROR HANDLE DURATION

BACKGROUND OF THE INVENTION

Backup servers including a plurality of data storage drives frequently encounter data communications errors when trying to access a drive. When a data communications error occurs, the drive access is retried multiple times, consuming time and adding time delays to client applications, resulting in system-wide down time. Despite the amount of time required for error retries, the error translation is not able to determine the cause of the error (e.g., whether the error is caused by a faulty drive or a faulty connection to the drive) quickly.

BRIEF DESCRIPTION OF THE DRAWINGS

Various embodiments of the invention are disclosed in the following detailed description and the accompanying drawings.

DETAILED DESCRIPTION

Figure 1:
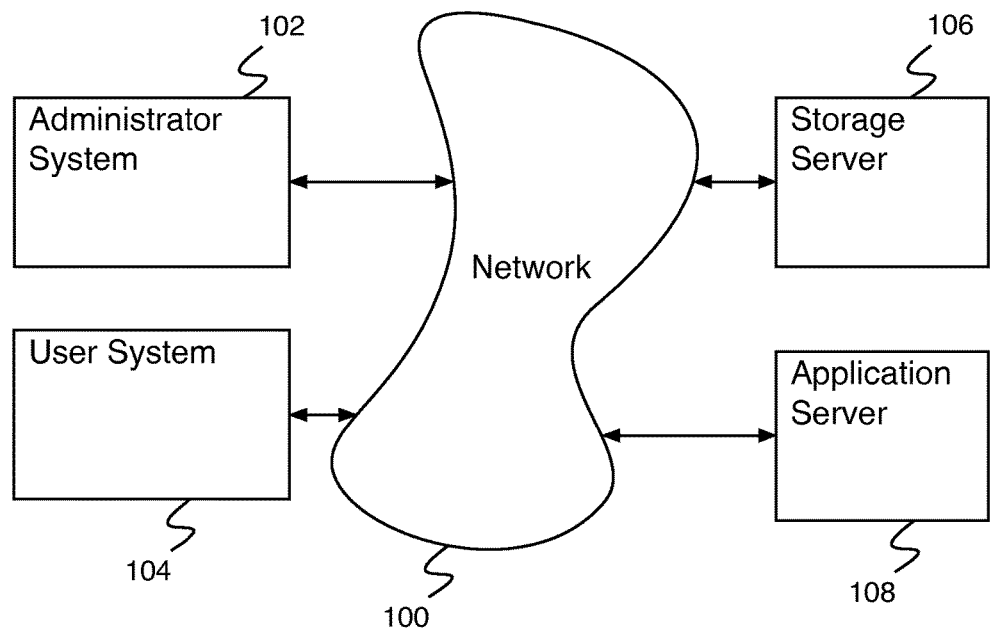
FIG. 1 is a block diagram illustrating an example of an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for handling errors during interfacing with storage devices is disclosed. The system comprises a communications interface for communicating with a first storage device using a first path or a second path. The system comprises an error handler for indicating to provide a first instruction to the first storage device using the first path. The error handler is for determining whether 1) an error message or 2) a short time out message is received in response to the first instruction. In the event the error handler determines that 1) the first error message or 2) the first short time out message is received, indicating to provide a second instruction to the first storage device using the second path and determining whether 1) the second error message or 2) the second short time out message is received in response to the second instruction. In the event that the error handler determines that the 1) second error message or 2) the second short time out message is received, indicating to provide a likely first storage device error message. In the event that the error handler determines that 1) the second error message or 2) the second short time out message is not received, indicating to provide a likely first path error message and an indicating to communicate using the second path.

In some embodiments, a system for handling errors during interfacing with storage devices comprises a storage controller connected to each of a plurality of storage devices using a first path and a second path. In some embodiments, the plurality of storage devices comprises a plurality of storage devices in a storage device rack. In some embodiments, the first path and the second path comprise alternate paths through the storage device rack. In some embodiments, each storage device includes a multiplexer to determine which of the first path and/or the second path to send and/or receive data on. In some embodiments, in the event a communications error occurs (e.g., the system for handling errors receives either a communications error message or a timeout message), communication using the alternate path is attempted. In the event that a communications error does not occur using the second path, it is determined that a first path error has occurred, and future communications are routed using the second path. In the event that a communications error occurs also using the second path, it is determined that a storage device error has occurred.

FIG. 1 is a block diagram illustrating an example of an embodiment of a network system. In the example shown, administrator system 102, user system 104, storage server 106, and application server 108 communicate with one another via network 100. In various embodiments, network 100 comprises one or more of the following: a local area network, a wide area network, a wired network, a wireless network, the Internet, an intranet, a storage area network, or any other appropriate communication network. In various embodiments, administrator system 102, user system 104, storage server 106, and application server 108 and subsets thereof are in physical proximity to one another (e.g., in the same building, in the same room, etc.) or are physically remote from one another (e.g., in separate buildings of a campus, in separate locations of a business, at separate offices of a collaboration between organizations, in separate countries, etc.). In various embodiments, the processors comprising administrator system 102, user system 104, storage server 106, and application server 108 comprise any one of a variety of proprietary or commercially available single or multi-processor systems (e.g., an Intel-based processor) or other type of commercially available processor able to support communications in accordance with each particular embodiment and application. In various embodiments, the network system comprises any appropriate number of administrator systems (e.g., as in administrator system 102), user systems (e.g., as in user system 104), storage servers (e.g., as in storage server 106), and application server (e.g., as in application server 108).

In the example shown, administrator system 102 comprises a system accessed by an administrator for administrating the network system of FIG. 1 or subsets of the network system of FIG. 1. In various embodiments, administrating the network system of FIG. 1 comprises configuring user system 104 (e.g., configuring application settings, network settings, security settings, etc.), configuring application server 108 (e.g., configuring applications, user settings, security settings, network settings, etc.), configuring storage server 106 (e.g., configuring storage devices, storage device mappings, storage device ports, backup schedules, security settings, etc.), configuring hardware comprising network 100, or administering any other appropriate attributes of the network system of FIG. 1. User system 104 comprises a system accessed by a user for accessing the network system of FIG. 1. In various embodiments, a user accesses the network system of FIG. 1 to store data, access data, backup data, execute applications, communicate with other users, or for any other appropriate purpose. Application server 108 comprises an application server for providing applications for use via the network system of FIG. 1. Storage server 106 comprises a storage server for storing data accessible via the network system of FIG. 1. In some embodiments, storage server 106 comprises a storage server for storing backup data. In some embodiments, storage server 106 comprises a deduplicating storage server. In some embodiments, storage server 106 comprises a storage server storing files as collections of file segments. In some embodiments, storage server 106 comprises a storage server storing files as collections of file segments and storing a file including a collection of segments and a segment reference in place of a storing a segment that is a duplicate of a segment already stored.

Figure 2:
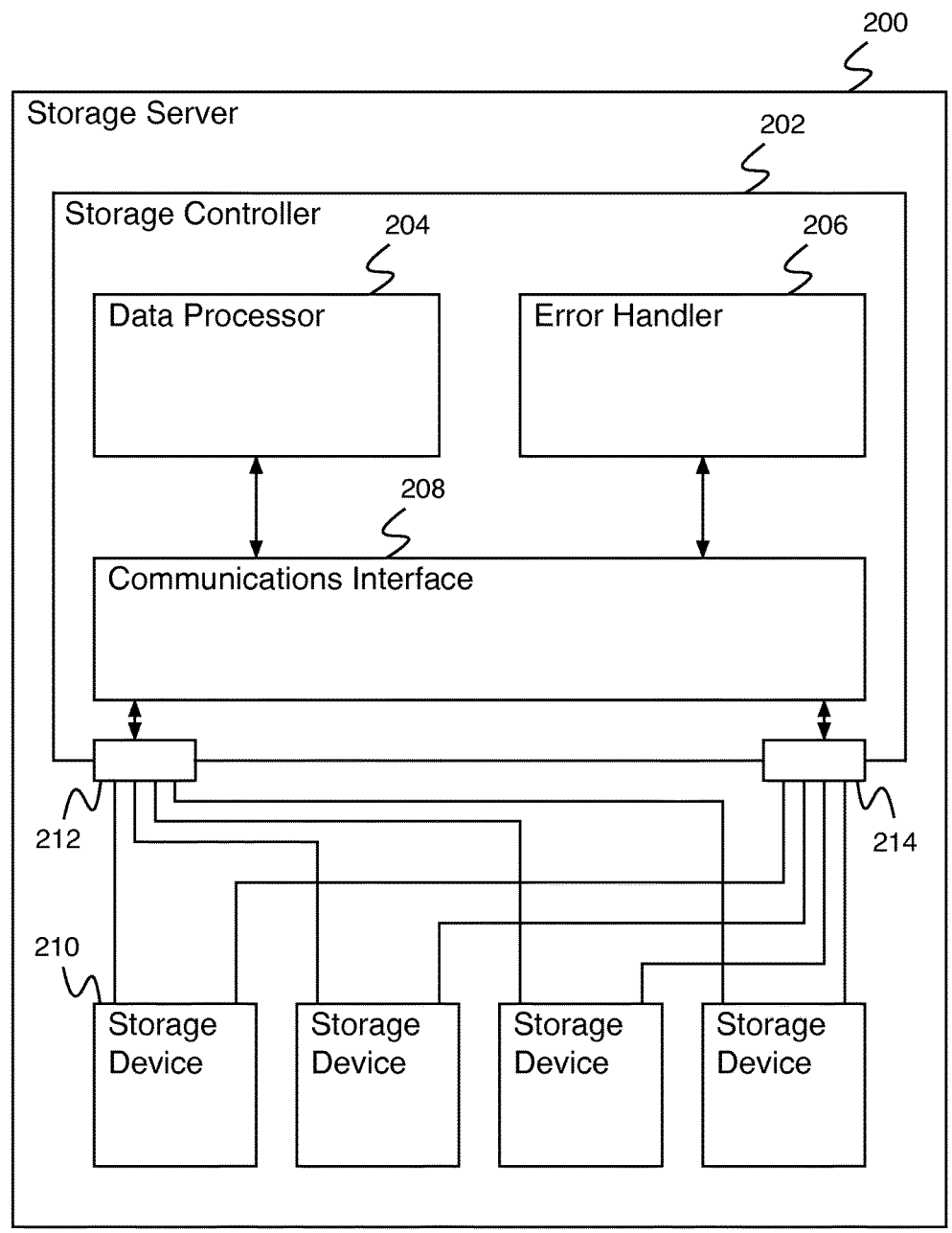
FIG. 2 is a block diagram illustrating an embodiment of a storage server.

FIG. 2 is a block diagram illustrating an embodiment of a storage server. In some embodiments, storage server 200 comprises storage server 106 of FIG. 1. In the example shown, storage server 200 comprises storage controller 202 communicating with a plurality of storage devices (e.g., storage device 210). In various embodiments, storage server 200 comprises 1, 2, 4, 5, 7, 8, 22, or any other appropriate number of storage devices. In the example shown, storage controller 202 comprises data processor 204. In various embodiments, data processor 204 comprises a data processor for determining data to provide to a storage device, determining commands to provide to a storage device, determining data to read from a storage device, determining a storage device to communicate with, determining a path or port to use in communicating with a storage device, or determining any other appropriate data processing function. In some embodiments, data processor 204 receives communications from a user system, an administrator system, an application server, a storage server, or any other appropriate system. In some embodiments, data processor 204 is implemented using a processor. Storage controller 202 comprises error handler 206. In some embodiments, error handler 206 comprises an error handler for determining whether an error message is received. In various embodiments, an error message comprises a communications error message (e.g., an error message from a controller or interface associated with a path), a short time out message (e.g., a message indicating a communication has been provided to a device but no response has been received within an appropriate short time period, where the short time period is shorter than a long time period), a long time out message (e.g., a message indicating a communication has been provided to a device but no response has been received within an appropriate long time period, where the long time period is longer than the short time period), or any other appropriate error message. In some embodiments, error handler 206 is implemented using a processor. Communications interface 208 comprises a communications interface for communicating with the one or more storage devices. In various embodiments, communications interface 208 provides data to a storage device, provides commands to a storage device, receives data read from a storage device, receives error messages from a storage device, determines time out messages, or provides any other appropriate communications interface function. In some embodiments, communications interface 208 is implemented using a processor. In various embodiments, the elements of storage controller 202 are implemented each on their own processor, all on a single processor, or combined onto multiple processors in any other appropriate way.

In some embodiments, communications interface 208 communicates with the plurality of storage devices via port 212 and via port 214. In some embodiments, port 212 and port 214 comprise output ports for providing communications. In some embodiments, port 212 comprises a controller (e.g., for controlling data output). In some embodiments, port 214 comprises a controller (e.g., for controlling data output). In some embodiments, communications interface 208 communicates with each of the plurality of data storage devices (e.g., data storage device 210) via both port 212 and port 214. In some embodiments, a communication path from a first port (e.g., port 212) to a first data storage device (e.g., data storage device 210) comprises a first cable. In some embodiments, a communication path from a second port (e.g., port 214) to a first data storage device comprises a second cable. In some embodiments, a communication path from a first port (e.g., port 212) to a first data storage device (e.g., data storage device 210) comprises a first port on the first data storage device. In some embodiments, a communication path from a second port (e.g., port 212) to a first data storage device (e.g., data storage device 210) comprises a second port on the first data storage device. In some embodiments, port 212 communicates with the first port of each of the plurality of data storage devices. In some embodiments, port 214 communicates with the second port of each of the plurality of data storage devices. In some embodiments, in the event a first communications path between storage controller 202 and a storage device of the plurality of storage devices is determined to not be functioning correctly, communications can be accomplished using a second path. In some embodiments, in the event a first communications path and a second communications path between storage controller 202 and a storage device of the plurality of storage devices are both determined to not be functioning, a determination is made that the storage device is not functioning correctly. In some embodiments, a first path between a port of storage controller 202 and a storage device of the plurality of storage devices and a second path between a port of storage controller 202 and a storage device of the plurality of storage devices are not the same (e.g., one of the paths is favored over the other path—for example, one path is shorter). In some embodiments, each storage device of the plurality of storage devices is stored in a storage device shelf. In some embodiments, port 212 communicates with a shelf of storage device via its top side (e.g., accessing storage devices at the top of the shelf first) and port 214 communicates with a shelf of storage devices via its bottom side (e.g., accessing storage devices at the bottom of the shelf first). In some embodiments, each storage device of the plurality of storage devices comprises a multiplexer for selecting between a first port (e.g., a first port of the storage device) and a second port (e.g., a second port of the storage device).

Figure 3:
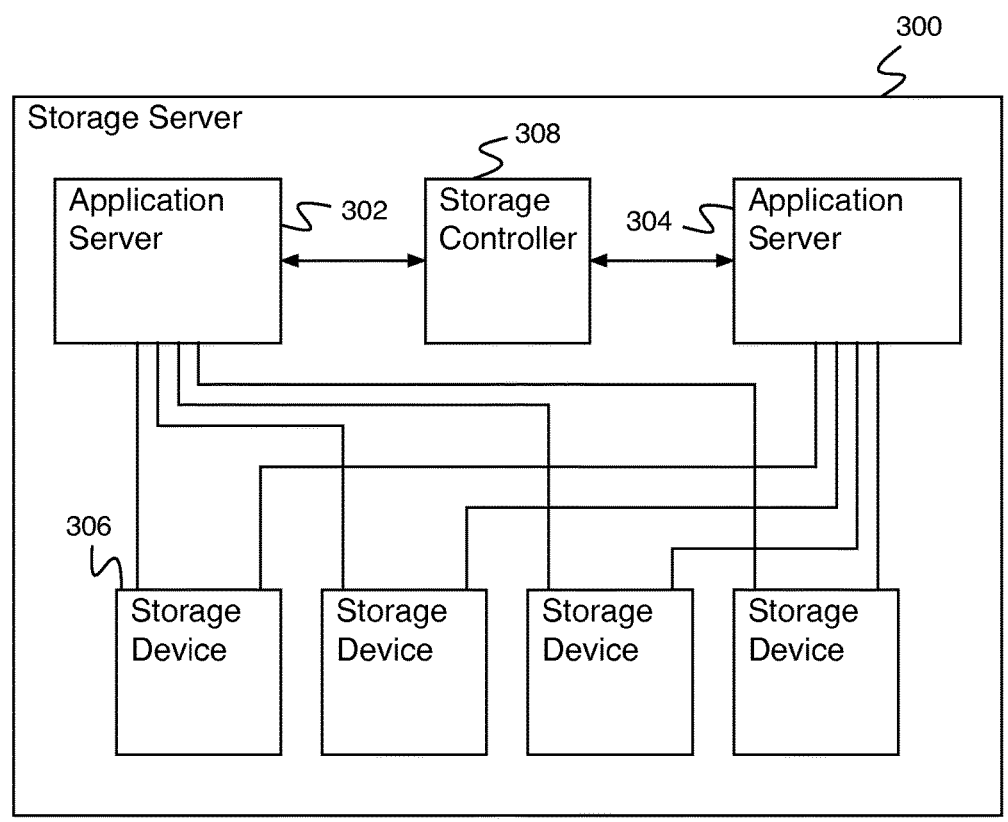
FIG. 3 is a block diagram illustrating an embodiment of a storage server.

FIG. 3 is a block diagram illustrating an embodiment of a storage server. In some embodiments, storage server 300 of FIG. 3 comprises storage server 106 of FIG. 1. In the example shown, storage server 300 comprises application server 302 and application server 304. In various embodiments, application server 302 and application server 304 comprise application servers for executing data storage applications, for executing user applications, for executing backup server applications, for executing deduplication algorithms, or for executing any other appropriate application server function. In various embodiments, application server 304 and application server 304 are implemented within the computing device of storage server 300, are implemented within the same hardware rack as storage server 300, are implemented within the same room as storage server 300, communicate with storage server 300 via a network, or are part of storage server 300 in any other appropriate configuration. Storage server 300 additionally comprises a plurality of storage devices (e.g., storage device 306). In the example shown, application server 302 communicates with each of the plurality of storage devices. In some embodiments, the communication path between application server 302 and a storage device of the plurality of storage devices comprises a first cable and a first port on the storage device. In the example shown, application server 304 communicates with each of the plurality of storage devices. In some embodiments, the communication path between application server 304 and a storage device of the plurality of storage devices comprises a second cable and a second port on the storage device. In some embodiments, in the event communications between application server 302 and a storage device of the plurality of storage devices is determined to not be functioning correctly, communications can be accomplished via application server 304. In some embodiments, in the event communications between both application server 302 and application server 304 and a storage device of the plurality of storage devices is determined to not be functioning correctly, a determination is made that the storage device is not functioning correctly. Storage controller 308 comprises a storage controller for providing storage control commands to application server 302 and application server 304. In various embodiments, storage control commands comprise read commands, write commands, directory listing commands, backup configuration commands, network configuration commands, or any other appropriate commands.

Figure 4:
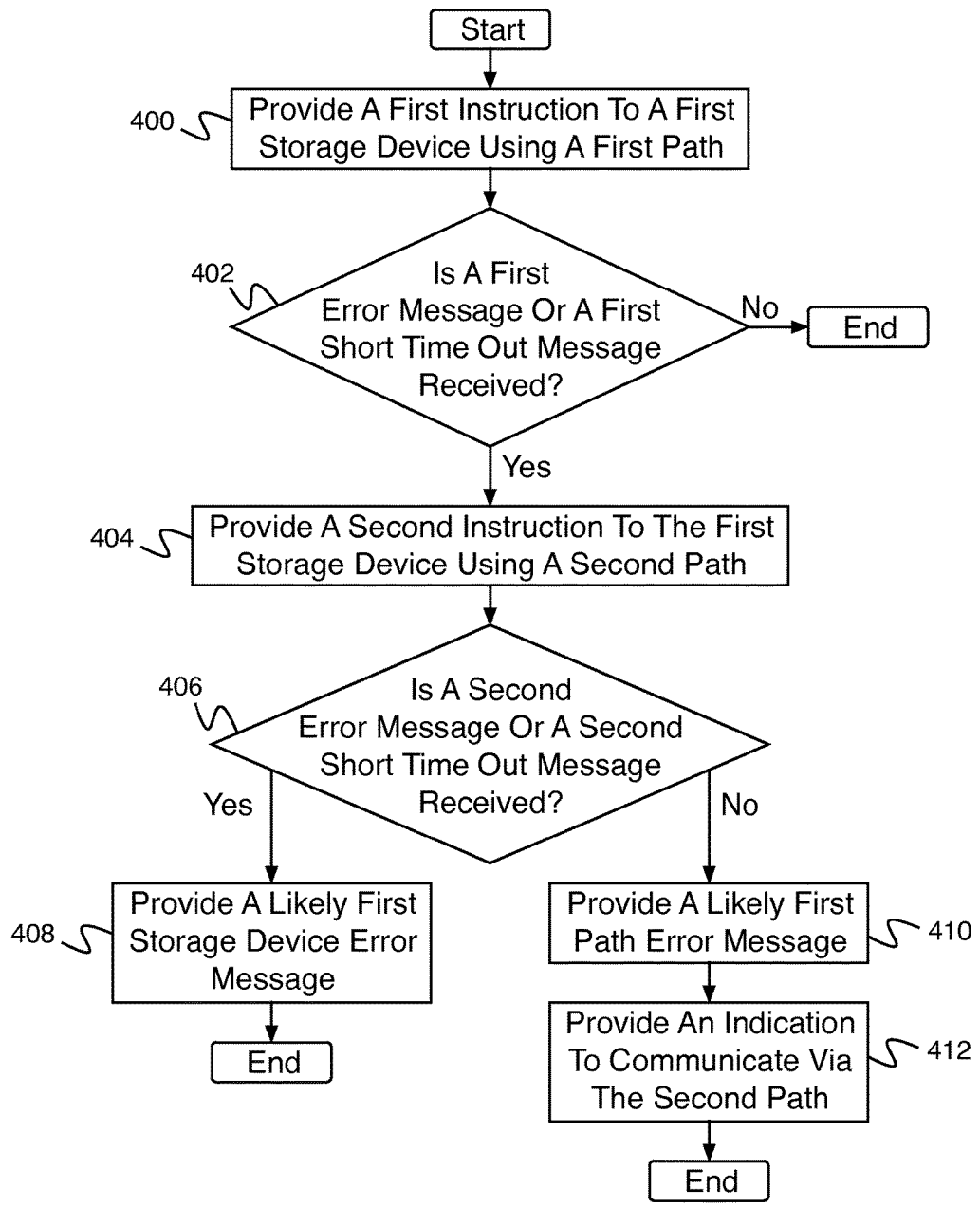
FIG. 4 is a flow diagram illustrating an embodiment of a process for handling errors during interfacing with storage devices.

FIG. 4 is a flow diagram illustrating an embodiment of a process for handling errors during interfacing with storage devices. In some embodiments, the process of FIG. 4 is executed by storage controller 202 of FIG. 2. In the example shown, in 400, a first instruction is provided to a first storage device using a first path. In 402, it is determined whether a first error message or a first short time out message is received. For example, in response to the first instruction, an error message or a time out message is received. In the event it is determined that a first error message or a first short time out message is not received, the process ends. In some embodiments, it is indicated to communicate using the first path. In the event it is determined that a first error message or a first short time out message is received, control passes to 404. In 404, a second instruction is provided to the first storage device using a second path. In 406, it is determined whether a second error message or a second short time out message is received. For example, in response to the second instruction, an error message or time out message is received. In the event it is determined that a second error message or a second short time out message is received, control passes to 408. In 408, a likely first storage device error message is provided (e.g., indicating the error messages or short time out messages are due to a storage device error), and the process ends. In the event it is determined in 406 that a second error message or a second short time out message is not received, control passes to 410. In 410, a likely first path error message is provided (e.g., indicating the error message or short time out message is due to a first path error). In 412, an indication to communicate via the second path is provided. In some embodiments, the indication to communicate via the second path is stored.

In some embodiments, the process of FIG. 4 is used by a storage server, one application server of a storage server, or any other appropriate server. In some embodiments, the process of FIG. 4 is expanded to use more than two attempts to communicate with a storage device using more than two paths. In some embodiments, in the event that each path of an attempt to communicate with a first storage device fail, then the server attempt to communicate with a second storage device.

Figure 5:
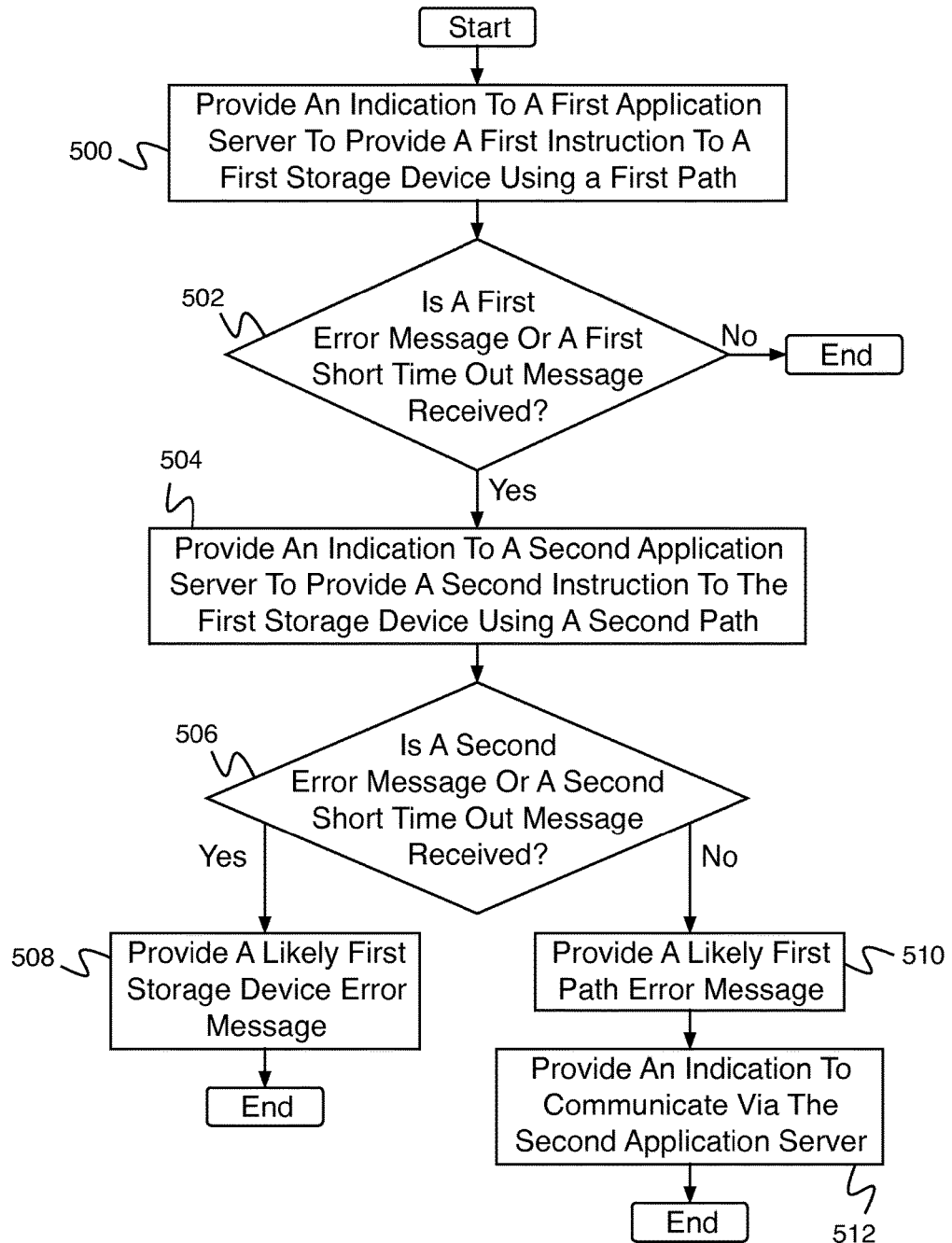
FIG. 5 is a flow diagram illustrating an embodiment of a process for handling errors during interface with storage devices.

FIG. 5 is a flow diagram illustrating an embodiment of a process for handling errors during interface with storage devices. In some embodiments, the process of FIG. 4 is executed by storage controller 308 of FIG. 3. In the example shown, in 500, an indication is provided to a first application server to provide a first instruction to a first storage device using a first path (e.g., the path from the first application server to the first storage device). In 502, it is determined whether a first error message or a first short time out message is received (e.g., in response to the first instruction). In the event it is determined that a first error message or a first short time out message is not received, the process ends. In some embodiments, it is indicated to communicate with the first storage device using the first path. In the event it is determined that a first error message or a first short time out message is received, control passes to 504. In 504, an indication is provided to a second application server to provide a second instruction to the first storage device using a second path (e.g., the path from the second application server to the first storage device). In 506, it is determined whether a second error message or a second short time out message is received (e.g., in response to the second instruction). In the event it is determined that a second error message or a second short time out message is received, control passes to 508. In 508, a likely first storage device error message is received (e.g., indicating the error messages or short time out messages are due to a storage device error), and the process ends. In the event it is determined in 506 that a second error message or a second short time out message is not received, control passes to 510. In 510, a likely first path error message is provided (e.g., indicating the error message or short time out message is due to a first path error). In 512, an indication to communicate via the second application server is provided. In some embodiments, the indication to communicate via the second application server is stored.

In some embodiments, the process of FIG. 5 is used by a storage server, two or more application servers of a storage server, or any other appropriate server. In some embodiments, the process of FIG. 5 is expanded to use more than two attempts to communicate with a storage device using more than two paths (e.g., providing a third instruction to the first storage device using a third path, etc.). In some embodiments, in the event that each path of an attempt to communicate with a first storage device fail, then the server attempts to communicate with a second storage device (e.g., providing a third instruction to a second storage device using a third path, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for handling errors during interfacing with storage devices, comprising:
   a communications interface for communicating with a first storage device using a first path or a second path; and
   an error handler for:
   indicating to provide a first instruction to the first storage device using the first path;
   determining whether an error message or a short time out message is received in response the first instruction;
   in the event the error handler determines that the first error message or the first short time out message is received:
   indicating to provide a second instruction to the first storage device using the second path;
   determining whether a second error message or a second short time out message is received in response to the second instruction;
   in the event the error handler determines that the second error message or the second short time out message is received, indicating to provide a likely first storage device error message; and
   in the event the error handler determines that the second error message or the second short time out message is not received, indicating to provide a likely first path error message and indicating to communicate using the second path.

2. The system of claim 1, wherein the first path comprises a first controller.

3. The system of claim 1, wherein the first path comprises a first cable.

4. The system of claim 1, wherein the first path comprises a first port on the first storage device.

5. The system of claim 1, wherein the second path comprises a second controller.

6. The system of claim 1, wherein the second path comprises a second cable.

7. The system of claim 1, wherein the second path comprises a second port on the first storage device.

8. The system of claim 1, wherein providing the first instruction to the first storage device using the first path comprises providing an indication to a first application server to provide the first instruction to the first storage device using the first path.

9. The system of claim 1, wherein providing the second instruction to the first storage device using the second path comprises providing an indication to a second application server to provide the second instruction to the first storage device using the second path.

10. The system of claim 1, wherein indicating to communicate via the second path comprises indicating to communicate using the second application server.

11. The system of claim 1, wherein the first storage device comprises a storage device of a plurality of storage devices.

12. The system of claim 11, wherein the plurality of storage devices are stored within a storage device shelf.

13. The system of claim 12, wherein the first path and the second path comprise paths within the storage device shelf.

14. The system of claim 13, wherein the first path and the second path are not the same length.

15. The system of claim 1, wherein in the event the error handler determines that the first error message or the first short time out message is not received, indicating to communicate using the first path.

16. The system of claim 15, wherein indicating to communicate via the first path comprises indicating to communicate using the first application server.

17. The system of claim 1, wherein in the event the error handler determines that the second error message or the second short time out message is received, indicating to provide a third instruction to the first storage device using a third path.

18. The system of claim 1, wherein in the event the error handler determines that the second error message or the second short time out message is received, indicating to provide a third instruction to a second storage device using a third path.

19. A method for handling errors during interfacing with storage devices, comprising:
   indicating to provide a first instruction to the first storage device using the first path;
   determining, using a processor, whether an error message or a short time out message is received in response the first instruction;
   in the event the error handler determines that the first error message or the first short time out message is received:
   indicating to provide a second instruction to the first storage device using the second path;
   determining whether a second error message or a second short time out message is received in response to the second instruction;
   in the event the error handler determines that the second error message or the second short time out message is received, indicating to provide a likely first storage device error message; and
   in the event the error handler determines that the second error message or the second short time out message is not received, indicating to provide a likely first path error message and indicating to communicate using the second path.

20. A computer program product for handling errors during interfacing with storage devices, the computer program product being embodied in a non-transitory computer readable storage medium and comprising computer instructions stored therein, which when executed by a processor, cause the processor to perform operations, the operations comprising:
   indicating to provide a first instruction to the first storage device using the first path;
   determining, using a processor, whether an error message or a short time out message is received in response the first instruction;
   in the event the error handler determines that the first error message or the first short time out message is received:
   indicating to provide a second instruction to the first storage device using the second path;

determining whether a second error message or a second short time out message is received in response to the second instruction;

in the event the error handler determines that the second error message or the second short time out message is received, indicating to provide a likely first storage device error message; and in the event the error handler determines that the second error message or the second short time out message is not received, indicating to provide a likely first path error message and indicating to communicate using the second path.

* * * * *